(12) United States Patent
Hums et al.

(10) Patent No.: US 6,451,250 B1
(45) Date of Patent: Sep. 17, 2002

(54) METHOD FOR OPERATING A SINTERING PLANT

(75) Inventors: Erich Hums, Hessdorf; Horst Spielmann, Baiersdorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/491,097

(22) Filed: Jan. 24, 2000

Related U.S. Application Data

(63) Continuation of application No. PCT/EP98/04256, filed on Jul. 8, 1998.

(30) Foreign Application Priority Data

Jul. 24, 1997 (EP) .............................. 97112726

(51) Int. Cl.⁷ .................................................. B22F 3/00
(52) U.S. Cl. ....................................................... 419/56
(58) Field of Search ........................................... 419/56

(56) References Cited

U.S. PATENT DOCUMENTS

| | | | | |
|---|---|---|---|---|
| 5,512,259 A | * | 4/1996 | Hagenmaier et al. .... | 423/239.1 |
| 5,783,515 A | * | 7/1998 | Sakurai et al. .............. | 502/207 |

FOREIGN PATENT DOCUMENTS

| | | | |
|---|---|---|---|
| EP | 0 039 305 A1 | 11/1981 | |
| EP | 0 645 172 A1 | 3/1995 | |
| GB | 2 155 457 A | 9/1985 | |

OTHER PUBLICATIONS

W. Weiss: "Minderung der PCDD/PCDF–Emissionen an einer Eisenerzsinteranlage", VDI Berichte Nr. 1298, 1996, pp. 269–285, reduction of PCDD/PCDF emissions in an iron ore sintering operation.

Japanese Patent Abstract No. 07243634 (Hiroshi), dated Sep. 19, 1995.

G. Mayer–Schwinning et al.: "Minderungstechniken zur Abgasreinigung für PCDD/PCDF", VDI Berichte Nr. 1298, 1996, pp. 191–227, reduction techniques for exhaust gas cleaning of PCDD/PCDF.

* cited by examiner

*Primary Examiner*—Ngoclan Mai
(74) *Attorney, Agent, or Firm*—Laurence A. Greenberg; Werner H. Stemer; Ralph E. Locher

(57) ABSTRACT

Disclosed is a method for reducing the dioxin content of the off-gas in operating a sintering plant, in which prior to sintering a material catalytically active in decomposing dioxins and in the form of fine grains or dust is admixed. The admixed catalytically active material prevents the fresh formation of dioxins and reduces the content of dioxins in the off-gas flowing through the material for sintering. The catalytically active material) is incorporated in the agglomerate of material for sintering which is forming and can be disposed of reliably and without danger via the slag formed in the following blast-furnace process.

10 Claims, 1 Drawing Sheet

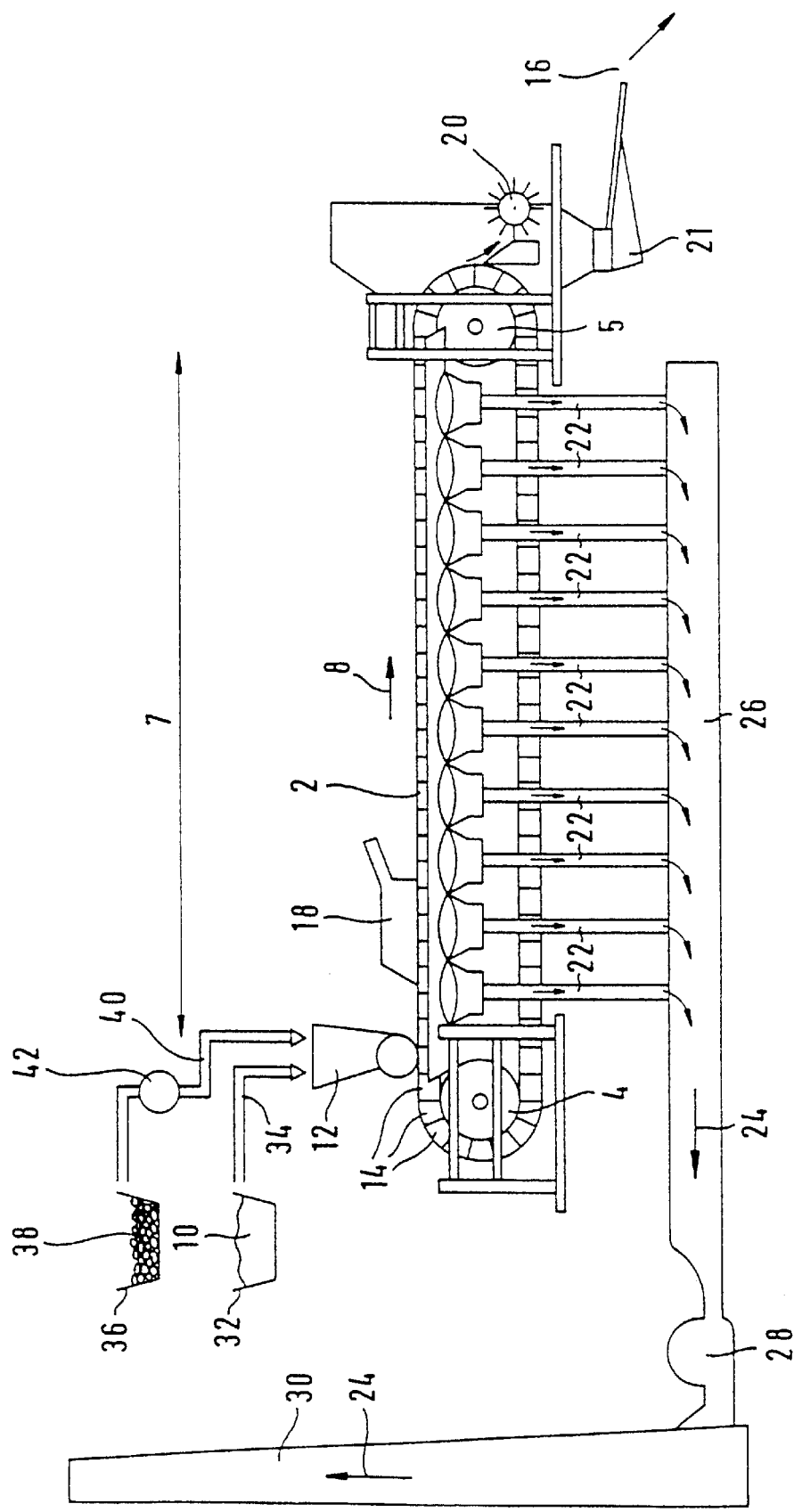

a continuation of copending International Application PCT/EP98/04256, filed Jul. 8, 1998, which designated the United States.

BACKGROUND OF THE INVENTION

Field of the Invention

The invention relates to a method for operating a sintering plant so as to reduce the emission of dioxins.

A sintering plant is a large-scale industrial plant used in the metallurgical industry and serves to convert fine grain or fine dust mixtures of metal, metal oxide or metal sulfide solids into lumps, so that they can be used for smelting. Only solids mixtures which have been made lumpy can be used in a blast furnace.

In the sintering plant, the material to be sintered, or material for sintering, is consolidated by sintering, i.e. by being heated to close to the melting point, with surface softening and partial formation of melt and slag. For this purpose, the material for sintering, which in the case of smelting of ore may, for example, be a fine ore, calcined pyrites, flue dust or a fine dust from a metal-processing industry, is placed on a so-called traveling grate, if appropriate together with recycled material, slag-forming additives or a solid fuel mixture. The traveling grate is generally designed as an endless chain of individual grate carriages, the chain running over corresponding diversion rollers in the operating direction of the sintering plant.

At an inlet position, the traveling grate carriages are filled with the material for sintering. In this process, in order to protect against the material for sintering falling through, the base of the grate carriage, which is designed as a grating, is first covered with previously roasted recycle from the sintering plant, and then the material for sintering, which can be mixed with fuel, is added. Then, the filled grate carriages pass by an ignition furnace, the material for sintering or the fuel contained therein being ignited at the surface by means of an ignition flame. Then, the combustion and sintering operation in the individual grate carriages continues automatically into the inside of the grate carriage as a result of self-combustion by means of combustion air which is fed through by an extractor or forced draught fan, while the grate carriages are transported to an outlet position.

Abraded material in the form of fine grains or fine dust from filing, grinding or drilling processes used in the metal-processing industry represents a large part of the material for sintering which is processed in the sintering plant. However, it is a disadvantage that this abraded material is often contaminated with oily drilling aids, lubricants or coolants, which include not inconsiderable quantities of halogenated hydrocarbons and aromatics. Therefore, the thermal processes during the sintering operation also produce dioxins in the sintering plant, which can pass into the environment via the off-gas. In this context, the term "dioxins" is used herein as a collective term for the group of cyclic halogenated aromatic ethers and polyethers. These include in particular the cyclic ethers (furans) and the cyclic diethers (the actual dioxins).

Polychlorinated dibenzodioxins (PCDD) and polychlorinated dibenzofurans (PCDF) can be mentioned here as particularly toxic representatives of these two groups.

GB 2,155,457 A has disclosed a method for operating a sintering plant in which an oxidation catalyst is admixed with the material for sintering prior to sintering in order to reduce the amount of hydrocarbons present.

Catalyst components mentioned are inorganic or organic compounds of the transition metals, such as Ni, Cu, Fe, V or Cr.

EP 0,645,172 A1 proposes a noble-metal-based dioxin catalyst for treating exhaust gases.

In comparison with other large-scale industrial plants used in the metal processing and extractive metallurgy industry, sintering plants therefore represent the major source of the emission of dioxins. Thus, in the off-gas from a sintering plant, dioxin levels of up to 60 ng TE/m$^3$ are found (TE=Toxic Equivalent). In order to keep the amount of dioxins released into the environment from a sintering plant below the legally prescribed limit level (currently 0.1 ng TE/m$^3$), it is known from W. Weiss: "Minderung der PCDD/PCDF-Emissionen an einer Eisenerz-Sinteranlage [Reduction of the PCDD/PCDF emissions from an iron ore sintering plant]", VDI Reports No. 1298 (1996), pp. 249 ff, to add a mixture of calcium hydroxide Ca(OH)2 and coal (in the form of hearth-furnace coke or activated charcoal) as an additive to the off-gas from a sintering plant for the purpose of dioxin adsorption and to remove the additive, which is to some extent laden with dioxins, from the off-gas again by means of a fabric filter and then to return it once again to the off-gas. Furthermore, it is known from G. Mayer-Schwinning et al.: "Minderungstechniken zur Abgasreinigung fur PCDD/F [Reduction techniques for off-gas cleaning for PCDD/F]", VDI Reports No. 1298 (1996), pp. 191 ff, to use zeolites as dioxin adsorbers in the off-gas from a sintering plant.

However, it is a disadvantage that the laden dioxin adsorbers must ultimately be land-filled, which brings about considerable costs and presents a threat to the environment.

SUMMARY OF THE INVENTION

It is accordingly an object of the invention to provide a method for operating a sintering plant that overcomes the above-mentioned disadvantages of the prior art devices and methods of this genera type, in which the dioxin emission when operating a sintering plant is reduced, without presenting additional hazards to the environment.

With the foregoing and other objects in view there is provided, in accordance with the invention a method for reducing the dioxin content of the off-gas in operating a sintering plant, in which prior to sintering a material catalytically active in decomposing dioxins and in the form of fine grains or dust is admixed with the material for sintering, and is sintered together with the material for sintering.

It has also been found, according to the invention, that foreign material admixed with the material for sintering, such as impurities, admixed slagging aids (silicates) or combustion aids (e.g. coke) is incorporated in the agglomerate of sintered material formed during the sintering operation in the sintering plant. Then, the incorporated foreign material passes into the blast furnace operation together with the sintered material, where it has no adverse effect on the formation of slag. On the contrary, the foreign material is even insolubly incorporated in the slag formed in the blast furnace.

Although as a rule the low off-gas temperatures of less than 200° C. mean that a catalytic reduction of the dioxin content in the off-gas from a sintering plant cannot be achieved, the incorporation of foreign material in the slag allows dioxins to be catalytically eliminated by adding catalytically active material to the material for sintering. On the one hand, material introduced in this way does not have any adverse effect on the sintering operation and on the subsequent smelting process of the sintered material. On the other hand, the introduction of catalytically active material as early as at the location where the dioxins are formed, i.e. during the combustion process in the material for sintering, causes the dioxins produced to be effectively reduced, and at the same time further formation of dioxins is prevented.

Since, in a sintering plant, the combustion air is sucked or blown through the material being sintered, the combustion gas or off-gas produced during combustion must inevitably flow past the catalytically active particles which have been admixed with the material for sintering.

In this way, a catalytically active material which is in the form of fine dust or fine grains and is admixed with the material for sintering makes it possible to achieve an effective reduction of the dioxin content in the off-gas flowing through. Sodium, potassium, magnesium, calcium, barium, zinc, nickel, lead, titanium, copper, iron, aluminum, platinum, vanadium, tungsten, molybdenum, rhenium or cerium, individually or in combination and in the form of fine dust, can be admixed with the material for sintering as the material with catalytic activity in degrading dioxins. Oxides, salts or silicates of the above-mentioned elements, individually or in a mixture of these, are also suitable for the catalytic degradation of dioxins under the conditions and temperatures of between 150 and 1200° C. which prevail in the material being sintered during the sintering operation.

A material composed of titanium dioxide, tungsten trioxide and/or vanadium pentoxide can also be admixed with the material being sintered as a particularly effective and preferred catalytically active material for degrading dioxins. A material of this kind is known as a highly effective dioxin catalyst for cleaning off-gases from incineration plants. In addition, a material of this kind can also contain admixtures of molybdenum oxide.

Since the admixed catalytically active material is integrated into the agglomerate of material being sintered during the sintering operation and is included insolubly in the slag produced in the subsequent smelting process in the blast furnace, fly ash from refuse and waste incineration plants can also be admixed with the material for sintering in order to remove dioxins.

Large quantities of this fly ash are contained in the off-gas from combustion plants of this kind and are removed from the off-gas with the aid of electrostatic filters. Fly ash of this kind is suitable as a catalytically active material for reducing the dioxin content, since the fly ash comprises admixtures of the above-mentioned catalytically active elements or compounds. In this way, the fly ash, which hitherto had to be expensively land-filled, can also be disposed of without danger. This is because any heavy-metal components which are contained therein are included in a water-insoluble manner in the slag produced in the blast-furnace process. In addition, a slag of this kind, in the form of granules, is a valuable filler material in the construction industry.

Advantageously, previously used dioxin catalysts can also be admixed with the material for sintering in finely-ground form as the catalytically active material. Previously used dioxin catalysts which are suitable are those dioxin catalysts which have been used for cleaning off-gases from combustion plants or internal-combustion engines and have become unusable for that particular use as a result of increasing agglomeration or as a result of the depletion of catalytically active material. If dioxin catalysts of this nature are added to the material for sintering in finely-ground form, on the one hand their residual activity is effectively exploited and on the other hand the catalyst constituents, together with any further materials adhering to the catalyst, are first included insolubly in the agglomerate of material being sintered and then in the slag produced in the blast-furnace process. Any hazardous materials adhering to the previously used dioxin catalyst are to some extent thermally decomposed by the high temperatures during the sintering operation. Therefore, disposing of previously used dioxin catalysts by using them as catalytically active material in the material being sintered represents a safe and economical disposal method.

Finely-ground residue or product waste from the production process for dioxin catalysts can also be admixed to the material for sintering as the catalytically active material. In this way, even residual material which has hitherto been considered worthless can still be used efficiently, exploiting its catalytic activity.

In order for the catalytically active foreign material integrated in the agglomerate of material for sintering not to have an adverse effect on the slagging process, it is advantageous if the weight ratio of catalytically active material to material for sintering is between 1:30 and 1:1, preferably between 1:20 and 1:5. Within the weight ratio indicated, the temperature profile in a blast furnace is not adversely affected and the flow or solidification behavior of the slag produced is also not adversely affected.

When the material for sintering is in the form of very fine grains or fine dust, it is advantageous for the catalytically active material to be intimately mixed with the material for sintering. This ensures reliable contact between the combustion off-gas formed and the admixed catalytically active material. However, it is also possible, in particular with relatively coarse material for sintering, to introduce the catalytically active material into the grate carriage in alternate layers with the material for sintering.

A suitable sintering plant comprises a container for material for sintering, a line for feeding material for sintering from the container for material for sintering to an inlet position, a conveyor device for conveying the material for sintering from the inlet position, along a sintering path to an outlet position, at which the sintered material can be removed, and an ignition furnace, which is arranged at the inlet position, for igniting the material for sintering. Furthermore, a storage container for material which has catalytic activity for decomposing dioxins and is in the form of fine grains or fine dust, and a line for feeding the catalytically active material from the storage container to the inlet position are provided, and the feed line comprises a device for the metered addition of the catalytically active material.

The catalytically active material is stored in the storage container and, when required, is admixed or added in a predetermined quantity to the material for sintering via the feed line at the inlet position of the sintering plant.

The catalytically active material can be mixed with the material for sintering before being placed in the grate carriages, if the feed line for the catalytically active material opens into the feed line for the material for sintering upstream of the inlet position. In this case, the material for sintering and catalytically active material can be mixed by being swirled in the feed line.

However, given a suitable configuration it is also possible to add material for sintering and catalytically active material alternately, so that a layer structure is formed in the individual grate carriages.

However, it is equally possible to locate the feed line for the catalytically active material in a separate introduction orifice next to the inlet position for material for sintering.

The catalytically active material, which is in the form of fine grains or dust, can be metered with the aid of a blower.

Other features which are considered as characteristic for the invention are set forth in the appended claims.

Although the invention is illustrated and described herein as embodied in a method for operating a sintering plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read connection with the accompanying drawing.

BRIEF DESCRIPTION OF THE DRAWING

The single FIGURE is a diagrammatic representation of a sintering plant.

DESCRIPTION OF THE PREFERRED EMBODIMENTS

In this respect, the figure shows a typical sintering plant used in the metallurgical industry, as employed for converting fine metallic dusts or fine metal ores into lumps. The sintering plant comprises a traveling grate or a sintering belt 2, which is guided over two deflecting rollers 4, 5. The endless sintering belt 2 conveys the material to be sintered or material for sintering 10 along a sintering path 7, in the direction of arrow 8. For this purpose, the material for sintering 10 is filled into the grate carriages 14 of the sintering belt 2 at an inlet position 12, as they move past the bottom of the inlet position, and is removed from the sintering plant at the end of the process at the outlet position 16. In order to allow air to pass through, each individual grate carriage 14 has a base which is designed as a grating.

The material for sintering 10, and any added fuel, in the traveling grate carriages 14 is ignited at the surface by an ignition flame in an ignition furnace 18. As a result of the introduction of air, the combustion and sintering operation proceeds automatically into the inside of the material for sintering 10.

At the end of the sintering path 7, the sintered material is guided over a toothed roll crusher 20, which breaks it into manageable pieces, and is finally removed from the sintering plant via the outlet position 16. The fine dust collected with the aid of a screen 21 can be returned to the sintering plant via the inlet position 12.

A series of downcomers 22 is provided along the sintering path 7 or along the sintering belt 2 in order to feed combustion air into the grate carriages 14 moving along the sintering path 7. Via these downcomers 22, the off-gas 24 flows into a common off-gas line 26. An extractor 28 is disposed on the off-gas line 26 in order to generate the required subatmospheric pressure in the downcomers 22. The outlet of this extractor 28 opens into a stack 30, through which the off-gas 24 passes into the environment.

The material for sintering 10, which is stored in a container 32 for material for sintering, passes via a feed line 34 into the funnel-shaped inlet position 12 and, via this inlet, into the individual grate carriages 14 which move past the bottom of the inlet position. In addition, the sintering plant is fitted with a storage container 36, in which fine-grained material 38 which has catalytic activity for decomposing-dioxins is stored. In this example, the catalytically active material is finely-ground, previously useddioxin catalyst based on titanium dioxide and tungsten trioxide with admixtures of vanadium pentoxide and molybdenum trioxide. The dioxin catalysts used are consumed dioxin catalysts previously employed for off-gas cleaning in the off-gas duct of a combustion plant, such as for example a fossil-fueled power station, a refuse-fueled heating and power station or a waste incineration plant. Of course, dioxin catalysts from application areas which are different altogether can also be admixed with the material for sintering in finely-ground form as the catalytically active material.

Owing to their composition, which is similar to dioxin catalysts, even previously used DeNOx catalysts for removing nitrogen from off-gases from a combustion plant are suitable as a catalytically active material of this kind.

The catalytically active material 38 is fed to the inlet position 12 via a feed line 40, and thence passes together with the material for sintering 10 into the grate carriages 14 which move past the bottom of the inlet position. The catalytically active material 38 supplied is metered with the aid of a blower 42 which conveys the fine-grained catalytically active material 38 through the feed line 40. Both the feed line 40 and the feed line 34 open into the funnel-shaped nlet position 12, immediately adjacent to one another. The catalytically active material 38 is mixed with the material for sintering 10 by means of the inlet position 12.

We claim:

1. A method for reducing the dioxin content of the off-gas in operating a sintering plant, in which prior to sintering a material catalytically active in decomposing dioxins and in the form of fine grains or dust is admixed with the material for sintering, and is sintered together with the material for sintering, the material including finely-ground, previously used dioxin catalyst.

2. The method according to claim 1, in which the catalytically active material comprises Na, K, Mg, Ca, Ba, Zn, Ni, Pb, Ti, Cu, Fe, Al, Pt, V, W, Mo, Rh or Cr, an oxide or a salt or a silicate of these elements, and mixtures thereof.

3. The method according to claim 2, in which the catalytically active material comprises titanium dioxide, tungsten trioxide and/or vanadium pentoxide.

4. A method for reducing the dioxin content of the off-gas in operating a sintering plant, in which prior to sintering a material catalytically active in decomposing dioxins and in the form of fine grains or dust is admixed with the material for sintering, and is sintered together with the material for sintering, the material including fly ash from refuse and/or waste incineration plants.

5. A method for reducing the dioxin content of the off-gas in operating a sintering plant, in which prior to sintering a material catalytically active in decomposing dioxins and in the form of fine grains or dust is admixed with the material for sintering, and is sintered together with the material for sintering, the material including finely-ground residue or product waste from the production process for dioxin catalysts.

6. The method according claim 1 in which the weight ratio between catalytically active material and material for sintering is between 1:30 and 1:1.

7. The method according claim 6 in which the weight ratio between catalytically active material and material for sintering is between 1:20 and 1:5.

8. The method according to claim 1, in which the catalytically active material is intimately mixed with the material for sintering.

9. The method according to claim 1, in which the mixture of catalytically active material and material for sintering is sintered at a temperature in the range from 150° C. to 1200° C.

10. The method according to claim 1, in which the catalytically active material is admixed with the material for sintering in the form of at least one layer.

* * * * *